Nov. 7, 1961   A. H. STARK   3,007,903
CONTINUOUS POLYMERIZATION PROCESS
Filed April 16, 1956
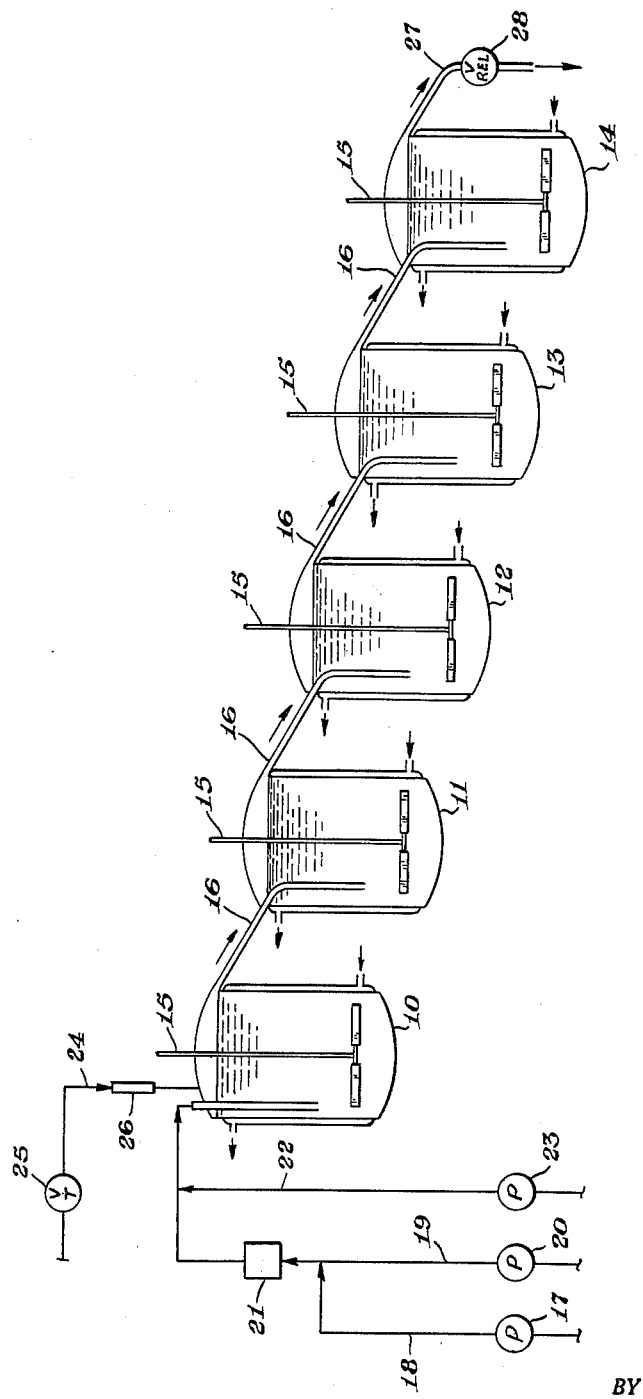
INVENTOR.
Alan H. Stark
BY
Griswold & Burdick
ATTORNEYS

3,007,903
CONTINUOUS POLYMERIZATION PROCESS
Alan H. Stark, Midland, Mich., assignor to The Dow Chemical Company, Midland, Mich., a corporation of Delaware
Filed Apr. 16, 1956, Ser. No. 578,404
4 Claims. (Cl. 260—87.7)

This invention relates to an improved process for the continuous polymerization of monoethylenically unsaturated monomers. More particularly it relates to such a process whereby those monomers may be continuously polymerized in non-emulsified suspension to give a uniform particle size distribution.

Monoethylenically unsaturated monomers, such as those represented by vinylidene chloride and vinyl chloride, have been polymerized using all of the conventional techniques, such as mass, solution, emulsion, and non-emulsified suspension. With those monomers which are insoluble in water and whose polymers are likewise insoluble in water, it has been found economically desirable and most practical to employ the non-emulsified suspension technique. In that technique the polymer is obtained in a useful form directly from the polymerization and does not have to be ground as is true with mass polymerization, precipitated as is true with solution, or coagulated as is true with emulsion polymerization. Additionally, suspension polymerization provides better heat transfer than either mass or solution polymerization and does not present as complicated a system as with emulsion polymerizations. One of the main drawbacks with suspension polymerization, heretofore, has been the difficulty of adapting it to a continuous polymerization system. A system that has been suggested and appeared promising, employs a series of cascaded reaction vessels with the level of reactants in any vessel at a lower level than the preceding level so that the reacting dispersion could overflow through a connecting pipe into the following vessel. Each vessel or its contents was agitated to produce a substantially homogeneous dispersion and the inlet and outlet ends of the connecting pipes were arranged to prevent short-circuiting as much as possible. There was no agitation in the connecting pipes so that the flow was non-turbulent gravitational flow. That system of cascading polymerization vessels would not operate with those polymers that passed through a sticky state during polymerization. Such polymers clogged the connecting pipes preventing the forward coursing of the dispersion through the remaining vessels.

It is accordingly the principal object of this invention to provide an improved continuous process for conducting non-emulsified suspension polymerizations.

It is a further object to provide such a process employing a series of connected cascading polymerization vessels.

It is a still further object to provide such a process whereby the connecting pipes between the cascading polymerization vessels remain unclogged throughout polymerization.

The above and related objects are accomplished by means of a process wherein a dispersion of a monoethylenically unsaturated monomer containing a suitable polymerization catalyst and granulating agents if required is metered continuously into an initial agitated reaction zone maintained at a temperature known to induce polymerization while simultaneously metering continuously into that zone a stream of an inert gas at a pressure greater than the vapor pressure of the monomers at the polymerization temperature and at a rate to keep a positive flow of gas through the system. The dispersion overflows into a downwardly slanting pipe connecting a second agitated reaction zone disposed below the top level of the reactants in the initial zone, to carry the polymerization to a higher degree of polymerization. The procedure is repeated in subsequent reaction zones until polymerization is substantially complete, and finally the product is recovered from the last of the reaction zones. The rate at which the monomer dispersion is supplied to the first zone is adjusted to provide a sufficiently long residence time in that zone to effect the desired degree of polymerization therein.

Any gas which is inert to the polymerization system may be employed. Typical of such gases, and representing a preferred gas, is nitrogen.

Although any monoethylenically unsaturated monomer capable of being polymerized in non-emulsified aqueous suspension may be employed in the process, it is preferred to use those water-insoluble monomers which pass through a sticky state at some stage during polymerization and whose polymers are insoluble in water. As typical of that preferred class of monomers may be mentioned vinylidene chloride and vinyl chloride either polymerized singly, with each other in any proportions, or with another monoethylenically unsaturated copolymerizable monomer, such as vinyl acetate or acrylonitrile. Those monomers are extremely difficult to polymerize in either solution or mass. Additionally those polymers are usually fabricated by thermal means requiring the polymer in a dry granular condition. Suspension polymerization methods are the most inexpensive for placing the polymer in such condition.

It is a common practice in suspension polymerization to employ a water-soluble or water dispersible granulating agent. The granulating agents that may be employed in this process are the same as those conventionally used and consist of hydrophilic colloids or colloid-like substances, such as methyl cellulose, methyl hydroxypropyl cellulose, water soluble starch, water-soluble gums, and the like. The necessary concentration of granulating agent will vary with each particular polymerization system but will usually be in the range of from 0.1 to 5 percent by weight based on the weight of the monomer. The optimum amount to be used in each case will either be known or may be determined by simple preliminary experiment. Since most of the granulating agents require prolonged mixing to achieve dissolution it is most convenient to prepare a concentrate of granulator prior to polymerization and to dilute the concentrate as required.

The catalysts useful for the suspension polymerization of monoethylenically unsaturated monomers are well-known. The usual catalysts are the oil-soluble peroxides, such as benzyl peroxide and lauroyl peroxide, although non-peroxide catalysts such as azodiisobutyronitrile may be used. Since it is a difficult task to add to a closed system small amounts of a solid material continuously or intermittently, it is preferred to dissolve the catalyst in a suitable solvent and add the catalyst as the solution. The solvent may be a substance, such as toluene, which is inert to the polymerization or it may be the monomer. Any stock solution of catalyst in monomer must be stored at a low temperature where premature polymerization cannot occur to any appreciable extent.

The ratio of water to monomer may be varied from about 1.5 to 1 to 8 to 1. When less than 1.5 parts of water per part of monomer are employed there is usually insufficient heat transfer for easy control of the reaction and the granulation of the polymer is poor. When more than 8 parts of water per part of monomer are used the process becomes unattractive economically.

The rate of agitation in each reaction zone should be sufficient to provide and maintain a substantially homogeneous dispersion of monomer in water. Agitation is also required to minimize any tendency for short-circuiting within any reaction zone. The latter requirement is particularly important when a series of kettles or vessels are used since the possibility of channeling from the orifice of the inlet pipe to the orifice of the outlet pipe is very great. The rate of agitation may be the same in all vessels, but this is not essential. The required rate may be easily determined by visual inspection of the dispersion and by examination of the polymer.

The dispersion flows by gravity through connecting pipes from one reaction zone to the next succeeding zone. In the connecting pipes the dispersion is in a non-turbulent condition, and the chances for agglomeration and coalescence are increased. For this reason it is preferred to keep the connecting pipes as short as possible within good design principles. It should be apparent that the outlet of one vessel should be near the top of that vessel and the inlet be near the bottom of the succeeding vessel.

The number of reaction zones that are needed will depend upon the particular polymerization system being employed and particularly on the rate of polymerization of that system. Although any plural number of zones may be employed in the process it is most practical to use from 5 to 10. When less than 5 are used, the danger of short-circuiting is great. The zones may take the form of polymerization kettles, or compartments in a coil or tube polymerizer. In all cases the contents of each zone must be agitated and the size of each zone, relative to the feed rate must allow a sufficient inventory time for the increment of conversion desired to be achieved.

Since the rate of polymerization is not constant but the rate of feed into the process is constant, it is necessary either to alter the polymerization rate from zone to zone by means of temperature control or the inventory time in a zone, or the increment of conversion in each zone. When it is desired to alter the rate it is necessary to have individual temperature control of each of the reaction zones. Initially there is usually an induction period before any polymerization occurs so that the initial reaction zone may be at a relatively high temperature. The rate of polymerization from about 5 to 70 percent conversion is relatively fast so that the intermediate zones could be at a lower temperature. The rate then slows down again so that the last kettles may again be at an increased temperature. Alternatively the inventory time may be varied or the increment of conversion in each zone varied. Thus, different sized vessels for each zone may be employed. Since that is not practical because a given set of equipment would be required for each polymerization system, it is preferred to use zones of uniform size and to vary the number of kettles necessary to achieve polymerization.

The inert gas should be employed at a pressure and a rate of flow capable of keeping a positive flow of gas moving through the system from the initial zone to the last zone. The minimum pressure of gas, entering the initial reaction zone must be greater than the highest vapor pressure of the polymerization system. Usually the highest pressure will occur in the first zones. The maximum pressure which may be used will be limited by the physical limits of the equipment used, but no appreciable benefits are exhibited by employing the gas at over 150 pounds per square inch. The actual pressure of inert gas used is important only to the extent that it is required to keep a positive flow of gas throughout the system. For that purpose it has been found that the pressure should be about 10 pounds per square inch higher than the vapor pressure of the polymerization system. It is more convenient to employ a metering device for measuring the volumetric rate of flow of gas through the system rather than to preselect pressure conditions. As long as a positive rate of flow of gas is maintained the process is operable.

It has been found desirable to disperse the active ingredients in the water prior to their introduction into the initial reaction zone. This may be accomplished by first mixing the monomer with the catalyst solution, then with the aqueous solution of granulating agent. Predispersion in this manner assures a proper droplet size distribution entering the initial reaction zone.

The operation of the process will be more apparent from the annexed schematic drawing and the following description of a preferred embodiment of a means for carrying out the process. In the drawing, a series of five jacketed polymerization kettles 10–14 fitted with agitators 15 are arranged in descending vertical disposition so that the top of each kettle 10–13 is about one-third the height of the kettle 10–13 above the next succeeding kettle 11–14. Connector pipes 16 are fixed to the top of each kettle 10–13 and extend through the top of the next succeeding kettle 11–14 to a point near the bottom of that kettle 11–14. Each kettle 10–14 is jacketed for individual temperature control. The monomer is fed from a weigh tank (not shown) through a metering pump 17 into a line 18 connecting with a feed line 19 feeding a catalyst solution through a metering pump 20. The monomer and catalyst solution are mixed in a mixing chamber 21 and are dispersed in a metered amount of water and granulating agent supplied through line 22 from a pump 23. The mixture then flows into the initial reaction kettle 10. A separate line 24 feeds inert gas at constant pressure through a valve 25 and then through a rotameter 26 to maintain a constant rate of flow of gas into the initial reaction kettle 10. The rate of flow of reactants through the kettles 10–14 and consequently the inventory time of the dispersion in each kettle 10–14 is controlled by the feed rate into the initial reaction kettle 10. The dispersion overflows into the connecting pipe 16 of the initial kettle 10 thence into the second kettle 11 and so on to the last kettle 14. The dispersion then overflows into a line 27 fitted with a backpressure controlled valve 28 into a vessel (not shown) from which subsequent filtering, washing, and drying operations may be conducted in conventional manner.

By way of example a monomeric mixture of 85 percent by weight of vinylidene chloride and 15 percent by weight of vinyl chloride was prepared. Separately a solution of 0.13 part methyl hydroxypropyl cellulose in water was prepared. One part of lauroyl peroxide was dissolved in 19 parts of toluene. The monomeric mixture was mixed in the mixing chamber at a ratio of one part monomer to 0.08 part catalyst solution. The combined solution was then dispersed in 3 parts of aqueous granulator solution and fed at a rate of 1.4 gallons per hour into a first kettle which was agitated at a temperature of 60° C. Nitrogen at a pressure of 90 pounds per square inch was fed at a rate of 1.5 cubic feet per hour into the first kettle. The dispersion overflowed into each succeeding kettle until it passed through the back-pressure control valve. The polymer was in beads of narrow particle size distribution and suitable for use directly in extrusion operations without grinding. The process was operated successfully for six weeks.

The process was likewise operated successfully when the dispersion was fed at a rate of 3 gallons per hour into the first kettle.

By way of contrast when the flow of inert gas was omitted, all other conditions being the same as before, the dispersion agglomerated in the connecting pipes in four hours stopping the flow of materials, and no polymer could be isolated.

I claim:

1. In a process for continuously polymerizing monoethylenically unsaturated monomers in non-emulsified aqueous suspension consisting of continuously metering an aqueous dispersion of such monomer and a polymerization catalyst into the first of a series of connected agitated reaction zones arranged in cascaded fashion so that the effluent of one zone will flow by gravity into the next adjacent zone, said zones being at a temperature capable of maintaining polymerization, allowing said dispersion in the first zone to overflow through connecting pipes having inlet and outlet ends disposed to prevent short-circuiting into the second of said zones and subsequently overflowing from each zone through connecting pipes into the next succeeding zone, and finally isolating the polymerized product in granular form, the improvement consisting of maintaining a co-current positive flow of an inert gas from the first of said reaction zones through the final of said reaction zones thereby preventing clogging of the pipes.

2. The process claimed in claim 1 wherein said monoethylenically unsaturated monomer comprises vinylidene chloride.

3. The process claimed in claim 1 wherein said inert gas is supplied under a pressure head of at least 10 pounds per square inch greater than the vapor pressure in any of the polymerization zones.

4. The process claimed in claim 1 wherein said inert gas is nitrogen.

References Cited in the file of this patent

UNITED STATES PATENTS

| | | |
|---|---|---|
| 2,326,326 | Breedis | Aug. 10, 1943 |
| 2,504,488 | Antonio et al. | Apr. 18, 1950 |
| 2,587,562 | Wilson | Feb. 26, 1952 |
| 2,616,872 | Bloem et al. | Nov. 4, 1952 |

FOREIGN PATENTS

| | | |
|---|---|---|
| 709,919 | Great Britain | June 2, 1954 |

OTHER REFERENCES

Chemical Engineer's Handbook by Perry, 1st ed., McGraw-Hill Book Co., p. 1825 pertinent.